Patented Jan. 19, 1954

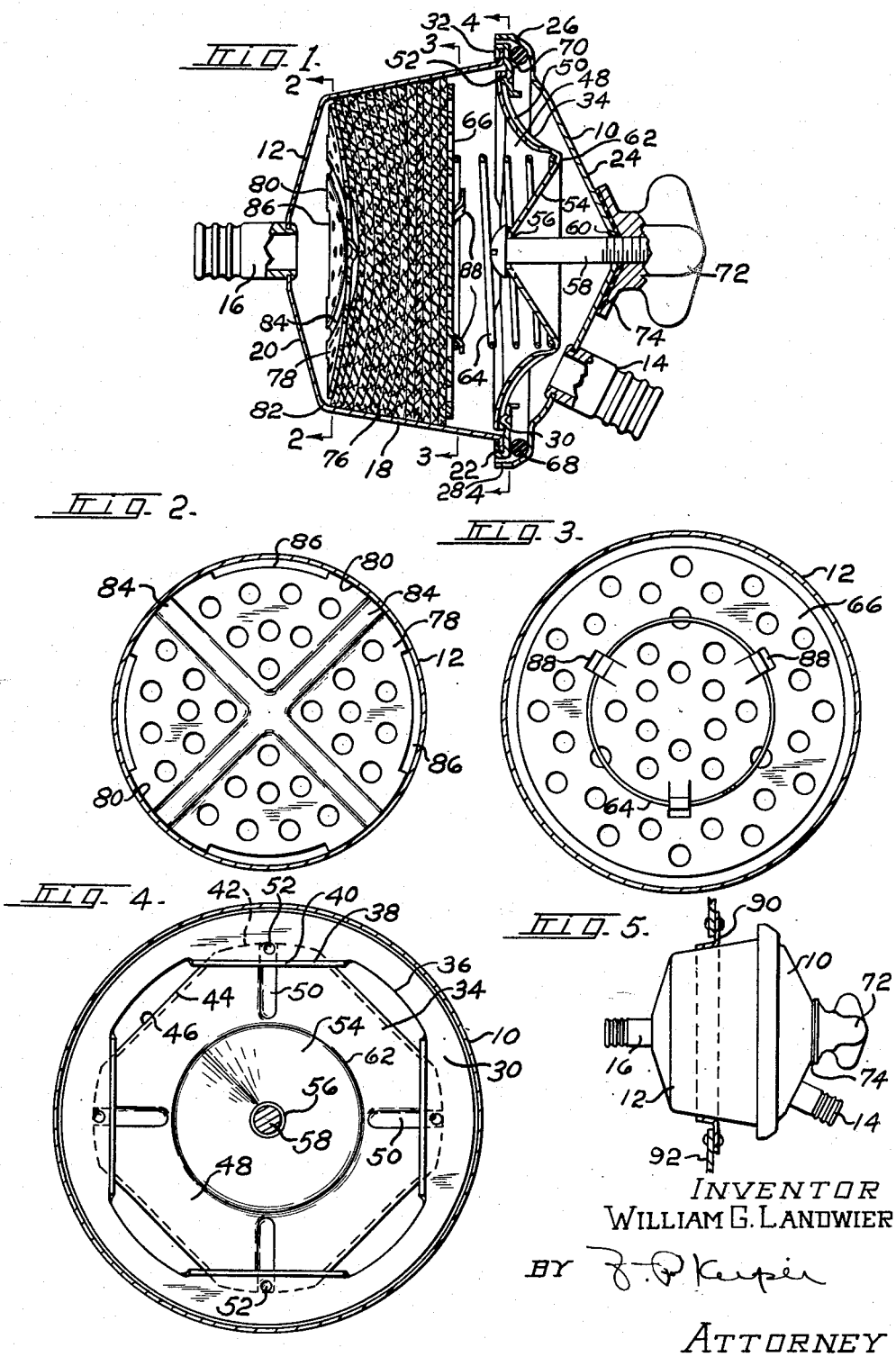

2,666,529

UNITED STATES PATENT OFFICE 2,666,529

FILTER

William G. Landwier, Fayetteville, N. Y., assignor to Easy Washing Machine Corporation, Syracuse, N. Y., a corporation of Delaware Application July 18, 1950, Serial No. 174,397

2 Claims. (Cl. 210—185)

This invention relates to filters, and particularly to a filter adapted for filtering domestic water of impurities liable to create stain in the rinsing of laundry.

In filters for domestic washing machines, where water is utilized for rinsing, it is desirable to remove from such water such elements as may cause staining of freshly laundered clothes. Filters providing opportunity for water passing therethrough to expend its staining or discolorability on a filter medium, such as terry cloth, unsized cheesecloth, or other material having an affinity for the staining elements, have been devised. The present invention relates to an improved casing structure, whereby the filter material may be readily changed.

In filters adapted for removing impurities from domestic water supply, it is necessary that the filter be readily opened for inspection and replacement of the filtering media. It is further essential that such filters be constructed to afford a relatively free flow of water therethrough, and also to withstand pressures as high as 50 to 100 pounds per square inch, which pressures are often present in domestic water supply systems. Additionally, it is desirable to so construct the filter that it may be made of relatively inexpensive parts, quickly assembled and disassembled, and with the parts so designed as to provide a filter which may be readily understood by the average domestic water user. It is also desirable to provide a filter which will utilize relatively inexpensive filter material, and in which, once the filter material is placed within the assembly, bypassing of water around the filter will be prevented.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a longitudinal section taken through the filter of the present invention;

Figure 2 is a section taken substantially on the line 2—2 of Figure 1;

Figure 3 is a transverse section taken substantially on the line 3—3 of Figure 1;

Figure 4 is a transverse section taken substantially on the line 4—4 of Figure 1; and Figure 5 is a side elevational view of the filter with an adapter ring for mounting the filter in a panel aperture.

Referring to Figure 1 of the drawings, there is shown a casing comprising opposed end members 10 and 12. The end member 10 is provided with an inlet connection 14 and the end member 12 with an outlet member 16. The member 12 has a tapered body section 18, a shallow cone or dome end 20, and a marginal outwardly extending flange 22 around the periphery of the larger end of the tapered body section. The end member 10 is centrally of a shallow conical shape as at 24 and provided with a rounded peripheral edge 26 and shallow skirt 28.

Secured to the flange 22 of the casing member 12 is a ring-like annular member 30 having a return bent flange 32 surrounding the flange 22, the return bent flange being spun around to provide a water-tight engagement with the flange 22 of the body portion 12. Such annular ring 30 is provided with an inner edge adapted to cooperate with a removable diaphragm 34, the latter being adapted to be seated upon the inside surface of the ring-like member 30, the diaphragm member 34 and annular member 30 being provided with bayonet-like lugs whereby the partition 34 may be assembled and secured in place by angular rotation.

More particularly, the annular member 30 is provided with angularly spaced recesses 36 and intervening inwardly extending portions 38 having a strengthening flange 40, whereas the diaphragm member 34 is provided with uniformly spaced tongue-like members 42 around its periphery with intervening webs of reduced radius 44, the outer edge thereof being flanges as at 46 for stiffening. The diaphragm 34 may be of a stamping and may be formed or shaped into inner and outer conical or curved section members whereby the diaphragm will be given substantial stiffness against dishing. The outer conical or curved section portion 48 may also have radial grooves 50 impressed therein which extend to the outer periphery of the tongues 42 and which may cooperate with a dimple 52 in the strengthening flange 40. It will thus be apparent that the diaphragm 34 may be inserted behind the ring-like member 30 by passing the tongues 42 through the enlarged diameter spaces 36 of the annular ring. Thereafter, by rotating the diaphragm through an angle of approximately 45°, the groove 50 may be brought to an angular position such that the dimple 52 will be received therein and under normal operating conditions, such dimple will prevent rotation of the diaphragm except when axially disposed a distance equal to the dimple height and rotated for removal. The inner conical section 54 of the diaphragm is pierced at its apex as at 56 to receive a tension bolt 58, the latter extending out through an aperture 60 in the end member 10. The annular groove 62 between the inner cone 54 and outer cone 48 is adapted to receive a compression spring 64 which is mounted upon a compression plate at its outer end, as will be described in greater detail hereinafter.

In the groove annular section 26 of the end member 10, there is positioned a substantially circular section ring washer of rubber-like material or neoprene 68, which is adapted to seat upon the outer annular face of the ring member 30, there being a slight shoulder in the annular member 30 as at 70 to hold the ring member in proper circular position. It will be seen that, by reason of the diaphragm 34, and the end member 10 and the bolt 58, with its thumb nut 72, the end member 10 is adapted to be securely held against the ring member 30, and in turn held in proper relation to the shell 12. A suitable washer 74 may be placed beneath the thumb nut 72 in engagement with the shell 10 to provide assurance against leakage.

Filter media 76, preferably in the form of circular disks of a diameter slightly greater than the maximum inside diameter of the tapered section 18 of the casing 12, are adapted to be placed in multiple layers within the casing, such disks being supported between the previously mentioned disk 66 and a slightly dished spacer member 78. Such spacer member has its marginal edge 80 soldered or otherwise secured in the annular corner 82 formed by the juncture of the tapered wall 18 and the conical wall 20. Such spacer member 78 may have transverse diametral grooves 84 and may be notched as at 86 around the peripheral edge. The disk 66 is secured to the end turn of the spring 64 by upstruck fingers 88 and both disks 78 and 66 are suitably perforated along their entire surfaces in order to permit free flow of medium being filtered therethrough.

The filter media may be composed of cloth disks, the cloth being of a type such as terry cloth or the like, affording maximum fibrous surface but also affording free flow therethrough. Such disks, when laid in the conical section 18 of the end member 12, are compacted around their edges by reason of the differences in diameter and by reason of the pressure plate or disk 66, the disks being held in such position that their edges are assured contact with the internal surface of the tapered shell 18 to prevent otherwise possible bypass of water around the edges of the filter media with consequent loss of efficiency of the filter.

It will be seen that the filter media 76 is first inserted into the filter, the end cover 10 and diaphragm 34 being removed. Thereafter, the coil spring 64 and diaphragm 66 are inserted, the latter being of such diameter as to fit through the enlarged diameter portions of the ring-like member 30. The coil spring provides light pressure upon the filter disks to hold them compressed and to secure them in place during assembly. Thereafter, the diaphragm 34 is inserted beyond the ring-like member 30 and given a 45° rotation to actuate or effectuate the bayonet lock. Thereafter, the cover member 10, with its gasket 68, is threaded upon the bolt 58 and the wing nut 72 suitably tightened.

It will be seen that such a filter is particularly adapted for use in filtering domestic water to be used in washing machines, wherein the outlet to the washing machine is a hose or other free-flowing connection. The flow of water is therefore usually controlled by a valve in the piping leading to the inlet nipple 14. Thus, under normal conditions, the shell structure of the filter is never under any substantial pressure except that produced by the back pressure of the filter media. However, as the filter media collects swarf and gradually clogs, back pressure may be created and the cover member and larger portion of the tapered shell 18 will become subjected to greater and greater pressures. Also, the pressure upon the filter media in an axial direction will be substantial and subject the parts to stress. However, the members 10 and 12 forming the shell of the filter, and the diaphragm member 34, will be seen to be so constructed as to be adequate to withstand the pressures resulting from the gradual clogging effect of the filter media. Such pressures, however, as may be developed will in no way jam the parts so that upon disconnection of the filter from the water source, all the parts may be readily and quickly disassembled, the filter media units washed and replaced, and the same reassembled with little delay and effort.

It will be apparent that the various members of which the filter is composed are readily stamped from heavy sheet metal whereby the construction may be mass-produced economically. If desired, the filter member 12 may have an annular flange 90 secured to its tapered body portion which in turn may be secured to a wall panel 92 of an appliance such as a washing machine, and that the end member 10 and elements of the filter may be readily removed from the shell and new filter material placed therein, the end shell 12 being conveniently supported by such wall panel during the operations of disassembly and assembly.

There is thus provided a filter readily adapted to the filtering of domestic water, particularly for the removal of impurities therein which would result in staining of laundry, the filter material being of a nature having at least the same affinity for such staining elements as the laundry, and having adequate capacity to remove all of the staining elements before passage to the laundry. Such filter is so constructed as to simplify inspection and replacement of the filter material, and at the same time afford strength to resist pressure should the filter be allowed to clog from use over too long a period, or under adverse water conditions.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A filter for domestic water supply for laundry purposes comprising a casing having a tapered wall and an outlet end wall at the reduced diameter end of said wall, an arched perforate plate seated against said end wall, woven fabric filter disks of a diameter to assure marginal edge contact with said tapered wall stacked against said plate, a pressure plate resting on the stack of filter disks, an inwardly directed flange at the enlarged diameter end of said wall, a removable diaphragm member supported behind and upon said flange, said diaphragm and flange having inter-engaging bayonet-like projections whereby to facilitate removal of said diaphragm past said flange, a seal ring positioned on said flange, an inlet cover bearing through said sealing means upon the outer marginal edge of said flange, means for drawing the diaphragm member and cover together to secure the cover in place, and a coil compression spring secured to said pressure plate and bearing against said diaphragm, said pressure plate being adapted to compress said filter material lying between said pressure plate and said arched plate axially of the tapered wall casing, and said casing and tapered wall forming the sole passage for flow of liquid from the inlet cover to the outlet end wall, whereby liquid flow is in a direction axial of the tapered wall casing toward the reduced diameter end thereof and from the pressure plate to the arch plate.

2. A filter for domestic water supply for laundry purposes comprising a casing having a tapered wall and an outlet end wall at the reduced diameter end of said wall, an arched perforate plate seated against said end wall, said casing being adapted to receive woven fabric filter disks of a diameter to assure marginal edge contact with said tapered wall stacked against said plate, a pressure plate adapted to rest upon a stack of filter disks bearing against said arched plate and tapered wall, an inwardly directed flange at the enlarged diameter end of said wall, a removable diaphragm member supported behind and upon said flange, said diaphragm and flange having inter-engaging bayonet-like projections whereby to facilitate removal of said diaphragm past said flange, a seal ring positioned on said flange, an inlet cover bearing through said sealing means upon the outer marginal edge of said flange, means for drawing the diaphragm member and cover together to secure the cover in place, and a coil compression spring secured to said pressure plate and bearing against said diaphragm, said pressure plate being adapted to compress filter material lying between said pressure plate and said arched plate axially of the tapered wall casing, and said casing and tapered wall forming the sole passage for flow of liquid from the inlet cover to the outlet end wall, whereby liquid flow is in a direction axial of the tapered wall casing toward the reduced diameter end thereof and from the pressure plate to the arch plate.

WILLIAM G. LANDWIER.

References Cited in the file of this patent

UNITED STATES PATENTS

| Number | Name | Date |
|---|---|---|
| 183,599 | Sinclaire | Oct. 24, 1876 |
| 639,471 | Van Alstine | Dec. 19, 1899 |
| 2,253,684 | Burckhalter | Aug. 26, 1941 |
| 2,511,800 | Wilkinson | June 13, 1950 |
| 2,578,020 | Sandberg | Dec. 11, 1951 |

FOREIGN PATENTS

| Number | Country | Date |
|---|---|---|
| 230,991 | Great Britain | of 1925 |